United States Patent
Blake et al.

(10) Patent No.: US 7,415,482 B2
(45) Date of Patent: Aug. 19, 2008

(54) XBRL ENABLER FOR BUSINESS DOCUMENTS

(75) Inventors: Robert W. Blake, Lone Tree, CO (US); Emily Huang, Denver, CO (US)

(73) Assignee: Rivet Software, Inc., Englewood, CO (US)

( * ) Notice: Subject to any disclaimer, the term of this patent is extended or adjusted under 35 U.S.C. 154(b) by 208 days.

(21) Appl. No.: 11/163,965

(22) Filed: Nov. 4, 2005

(65) Prior Publication Data

US 2006/0184539 A1 Aug. 17, 2006

Related U.S. Application Data

(60) Provisional application No. 60/652,210, filed on Feb. 11, 2005.

(51) Int. Cl.
*G06F 17/30* (2006.01)
(52) U.S. Cl. ........................ 707/102; 707/100
(58) Field of Classification Search ............... 707/1–6, 707/100; 715/505; 705/33–35
See application file for complete search history.

(56) References Cited

U.S. PATENT DOCUMENTS

| | | | | |
|---|---|---|---|---|
| 6,209,124 B1 * | 3/2001 | Vermeire et al. | ............ | 717/114 |
| 6,424,979 B1 * | 7/2002 | Livingston et al. | .......... | 715/511 |
| 6,535,896 B2 * | 3/2003 | Britton et al. | ............... | 715/523 |
| 6,601,057 B1 * | 7/2003 | Underwood et al. | ........... | 707/1 |
| 6,678,867 B2 * | 1/2004 | Fong et al. | ................... | 715/523 |
| 6,947,947 B2 * | 9/2005 | Block et al. | .................. | 707/102 |
| 7,107,229 B1 * | 9/2006 | Sullivan | ........................ | 705/26 |
| 7,155,670 B2 * | 12/2006 | Takizawa et al. | ............ | 715/523 |
| 2002/0102212 A1 | 8/2002 | Black | ......................... | 424/9.6 |
| 2003/0037038 A1 | 2/2003 | Block et al. | .................... | 707/1 |
| 2003/0041077 A1 | 2/2003 | Davis et al. | ................. | 707/500 |
| 2003/0149935 A1 | 8/2003 | Takizawa et al. | ............ | 715/513 |
| 2003/0172013 A1 | 9/2003 | Block et al. | .................... | 705/33 |
| 2004/0019853 A1 | 1/2004 | Takizawa et al. | ............ | 715/523 |
| 2004/0133583 A1 | 7/2004 | Tingey | ....................... | 707/100 |
| 2004/0193520 A1 | 9/2004 | LaComb et al. | ............... | 705/35 |

(Continued)

OTHER PUBLICATIONS

Microsoft Corp., "Microsoft Office Tool for XBRL™ Prototype," Apr. 2004, 1 page, Microsoft Corporation.

(Continued)

*Primary Examiner*—Don Wong
*Assistant Examiner*—Sheree N Brown
(74) *Attorney, Agent, or Firm*—Hamilton, DeSanctis & Cha, LLP

(57) ABSTRACT

Systems and methods for creating an extensible Business Reporting Language (XBRL) instance document are provided. In one embodiment, a business document production application displays a portion of a business document containing business data that is intended to be tagged; and concurrently a tagging application manager integrated with the business document production application displays a portion of an XBRL taxonomy. Responsive to a user input event corresponding to a selection of an XBRL attribute and corresponding to a request to map the selected XBRL attribute to a selected cell or range of displayed business data, (i) XBRL markup information is created by forming an association between the selected XBRL attribute and the selected business data; and (ii) the business data is signified as having XBRL markup data by providing an associated visual indication. Then, an XBRL instance document is generated based on the XBRL markup information and the business data.

20 Claims, 14 Drawing Sheets

U.S. PATENT DOCUMENTS

| | | | |
|---|---|---|---|
| 2004/0194009 A1 | 9/2004 | LaComb et al. | 715/500 |
| 2004/0236858 A1 | 11/2004 | Schwartz | 709/230 |
| 2004/0260566 A1 | 12/2004 | King | 705/1 |
| 2004/0260582 A1 | 12/2004 | King et al. | 705/7 |
| 2004/0260583 A1 | 12/2004 | King et al. | 705/7 |
| 2004/0260591 A1 | 12/2004 | King | 705/8 |
| 2004/0260628 A1 | 12/2004 | Minton et al. | 705/30 |
| 2004/0260634 A1 | 12/2004 | King et al. | 705/35 |
| 2005/0004891 A1 | 1/2005 | Mahoney et al. | 707/3 |
| 2005/0021427 A1 | 1/2005 | Takahashi et al. | 705/30 |
| 2005/0144166 A1* | 6/2005 | Chapus et al. | 707/6 |
| 2005/0182777 A1 | 8/2005 | Block et al. | 707/100 |
| 2005/0183002 A1* | 8/2005 | Chapus | 715/505 |

OTHER PUBLICATIONS

Microsoft Corp., "Microsoft Office Tool for XBRL—Screen Shots," Nov. 2003, 4 pages, Microsoft Corporation.

\* cited by examiner

XBRL ENABLER FOR BUSINESS DOCUMENTS

CROSS-REFERENCE TO RELATED APPLICATIONS

This application claims the benefit of U.S. Provisional Patent Application No. 60/652,210, filed Feb. 11, 2005, entitled "XBRL ENABLER FOR BUSINESS DOCUMENTS," which application is incorporated by reference into this application in its entirety.

FIELD OF THE INVENTION

The present invention relates generally to the extensible Business Reporting Language (XBRL) and, in particular, to an XBRL application or program.

BACKGROUND OF THE INVENTION

XBRL provides a standard for allowing business data to be exchanged among different computer systems and software applications. XBRL is based upon the extensible Markup Language (XML) and has been developed by a consortium of companies and organizations worldwide (such as accounting firms, trade organizations, software vendors, financial institutions and governments). XBRL provides a basis for users to "tag" or "mark up" data within business documents with standardized classifications or definitions which span a multitude of industry reporting and accounting standards and allow a variety of software applications to understand the meaning and context of the information. As just one example of the use of XBRL, the United States Securities and Exchange Commission (SEC) has recently begun a pilot program in which the filing of SEC reports in XBRL is encouraged.

As summarized on the XBRL International website:

"The idea behind XBRL is simple. Instead of treating business information as a block of text—as in a standard internet page or a printed document—it provides an identifying tag for each individual item of data. This is computer readable. For example, company net profit has its own unique tag.

The introduction of XBRL tags enables automated processing of business information by computer software, cutting out laborious and costly processes of manual re-entry and comparison. Computers can treat XBRL data "intelligently": they can recognize the information in a XBRL document, select it, analyze it, store it, exchange it with other computers and present it automatically in a variety of ways for users. XBRL greatly increases the speed of handling of financial data, reduces the chance of error and permits automatic checking of information.

Companies can use XBRL to save costs and streamline their processes for collecting and reporting financial information. Consumers of financial data, including investors, analysts, financial institutions and regulators, can receive, find, compare and analyze data much more rapidly and efficiently if it is in XBRL format.

XBRL can handle data in different languages and accounting standards. It can flexibly be adapted to meet different requirements and uses. Data can be transformed into XBRL by suitable mapping tools or it can be generated in XBRL by appropriate software."

While the foregoing quote from the XBRL Web-site notes a number of benefits associated with the association of XBRL attributes with data in a business document (which is also known as "tagging"), the accountants and other individuals that generate the business documents for which XBRL tagging is appropriate typically have to associate tagging information with data in their business documents via text/XML editing tools, such as "Microsoft Notepad," or by using complex XBRL-based stand-alone applications that require user to copy/paste, re-key or import data before being able to convert to XBRL.

Consequently, there is a need for tools that allow individuals that generate business documents to associate XBRL attributes with data or locations in their documents that avoids the tagging of information manually via tools like text/XML editors or by using XBRL-based stand-alone applications that are typically difficult for many of the individuals that generate business documents to learn and/or use.

SUMMARY OF THE INVENTION

The present invention is directed to a computer program that is resident on a computer readable medium and, more specifically, to a computer program that manages the operations of: (a) tagging or associating XBRL attributes with location or target ranges in a business document to produce a marked up document; (b) validating a marked up document to produce a validated, marked up document; and (c) producing an XBRL instance document from a validated, marked up document. This integrated approach avoids having to perform a particular XBRL related function in one application and another XBRL related function in another application and the related exporting/importing of files between the applications. In operation, the program facilitates the association of an attribute associated with an XBRL taxonomy with a location in a business document. The program comprises an utility for managing communications between the computer program and a business document production application (e.g., Microsoft® applications such as Word and Excel) that is capable of being used to generate a business document that contains business data and viewing such a business document. The program is further comprised of a taxonomy attribute linker that provides a user of a computer that is running a business document application in which the program has been embedded with the capability to associate an attribute of a business taxonomy with a business document being processed by the application. In one embodiment, the taxonomy attribute linker provides the user with the capability to identify the location or target range within the portion of document that is being displayed on the display device with which an attribute is to be associated, select an attribute from the portion of the taxonomy that is simultaneously being displayed on the display device, and associate the selected attribute with the identified location or target range within the document by "dragging and dropping" the attribute on the location. The taxonomy attribute linker processes a "drag and drop" event such that the selected attribute is mapped to the selected location or target range within the document. Typically, the identification of the location or target range in the document, selection of an attribute in the taxonomy, and the "dragging and dropping" are accomplished by the user appropriately manipulating a computer mouse.

The program further comprises a validation utility that processes a document that has one or more XBRL attributes associated with one or more locations or target ranges within the document. The validation utility is capable of: (a) performing numeric validation of numeric data in a tagged location or target range and (b) performing content and document level validation to assure that all appropriate XBRL attributes and non-XBRL attributes (such as calendar information) have been associated with a location or target range. The program is further comprised of an export utility that processes a marked up document with which XBRL attributes have been associated and that has been validated to generate an XBRL instance document that is suitable for export to other applications that are capable of processing XBRL instance documents.

It should be appreciated that an embodiment of the program comprised of the add-in utility, taxonomy attribute linker, validation utility, and export utility provides the user with an integrated solution to producing XBRL instance documents. To elaborate, when such a program is executing within the business document production application, the user is able to produce the business document, tag locations or target ranges within the document, validate the tagged document, and process a validated document to produce an XBRL document suitable for export to recipients that are capable of processing XBRL instance documents within the program. Consequently, the need to the manually enter tagging information via tools like text/XML editors and/or use XBRL-based stand-alone applications is avoided.

Yet another embodiment of the program comprises one or more tagging utilities that further facilitate the tagging of a location or target range within a business document with one or more attributes. One such utility is an attribute collection utility that allows a user to define a collective attribute that includes two or more pre-existing attributes, typically XBRL attributes that are not associated with an XBRL taxonomy, such as calendar, unit, precision etc. attributes and the like. Consequently, if the user commonly produces business documents having locations or target ranges with which two or more attributes are frequently associated, the user can use the attribute collection utility to define an attribute that includes the two or more attributes and thereby reduce the number of operations needed to associate those attributes with a location or target range to a single association operation or sequence of operations.

Another tagging utility is an extension taxonomy utility that allows a user to define a new XBRL attribute or element for an extension taxonomy, an entity/company-unique taxonomy. Even though many of the existing XBRL taxonomies that have been defined by various industry groups are quite extensive, it is not uncommon for a user to have a need for an attribute or element that is not in the relevant taxonomy. The extension taxonomy utility provides the user with the ability to define an attribute or element that is not part of the existing taxonomy.

A further embodiment of the program comprises an import utility that allows a business document that has been tagged with XBRL attributes prior to the current session in which the execution of the program within a business document production application to be imported and processed. Consequently, the program is able to: (a) import business documents that have been tagged by other means and process those documents; and (b) import business documents that have been previously tagged using the program and then saved for additional processing at a later time.

Another embodiment of the program is directed to the production of XBRL forms, i.e., business documents in which one or more attributes are associated with one or more locations or target ranges within the document that do not contain any data and that are structured to be provided to an outside entity that fills in the missing data. For example, an accountant may want to provide an XBRL form to business clients that allow the clients to provide data that the accountant needs to prepare quarterly reports that can be submitted to the SEC in an XBRL document. In one embodiment, the program provides the user with the ability to produce a web or template form that that includes XBRL attributes which are associated with "blanks" (i.e. locations in which an outside entity can insert data). In the case of a web form, an outside entity (such as an accountant's client) accesses the web-page and enters the requested data into the form on the web-page After the necessary data has been entered, the outside entity clicks on a "submit" button that has the effect of causing the marked up document, which is now populated with marked up data, to be processed to create an XBRL instance document that is suitable for use by other applications.

The present invention is further directed to a computer program that is resident on a computer readable medium and, more specifically, to a XBRL instance document translation application that operates to translates the data that is contained within an XBRL instance document into a format that is more readily understood by many individuals. To elaborate, XBRL instance documents have a format that facilitates the processing of such documents by XBRL computer programs but is typically quite difficult for individuals that are not familiar with XML/XBRL or do not have the time or inclination to become familiar with such programming languages to decipher. The program is capable of processing XBRL instance documents to produce a document that is more readily understood by a greater number of individuals that may need to understand the information present in an XBRL instance document. For example, the program is capable of translating the information or data in an XBRL instance document into a conventional table or spreadsheet format.

DETAILED DESCRIPTION

Figure 1:
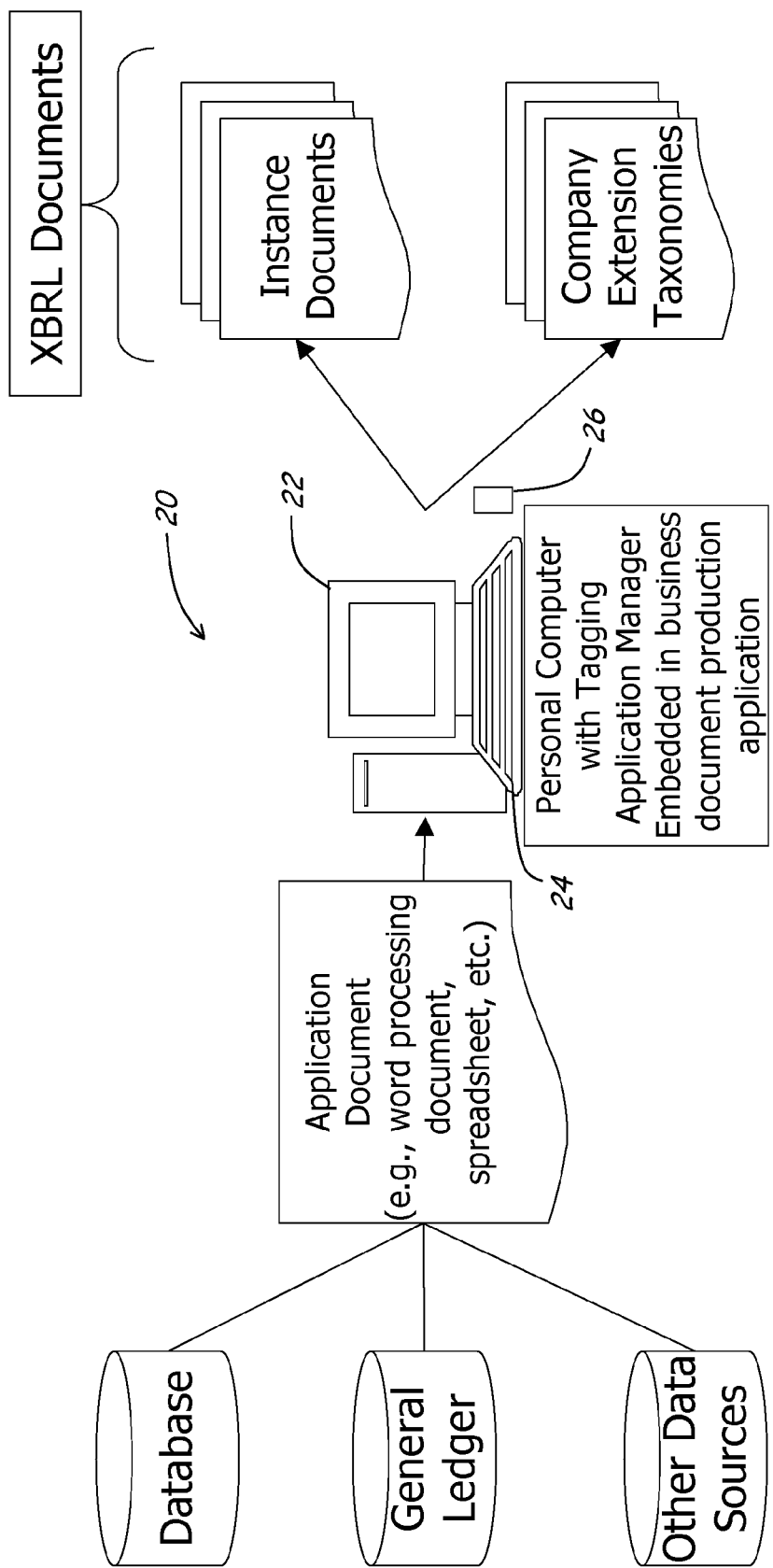
FIG. 1 is a block diagram of a computer environment in which an embodiment of a tagging application manager can be employed.

With reference to FIG. 1, a typical computer environment within which an embodiment of a computer program that manages operations associated with tagging or associating of XBRL attributes with locations or target ranges in a business document is illustrated. The program is hereinafter referred to as a tagging application manager. The environment comprises a computer 20 that includes a processor that is capable of running or executing a business document production application that allows embedding of the tagging application manager such that when the business document production application is being executed by the processor the tagging application manager is also be executed by the processor. Typically, the business document production application and tagging application manager are each stored in a memory associated with the computer 20, such as a disk drive that resides in the computer or a disk drive that is available to the computer 20 via a computer network. The computer 20 is further comprised of a monitor 22 that provides visual information to the user during execution of the business document production application and tagging application manager. While a monitor is the preferred output peripheral, it should be appreciated that use of the application manager is not limited to computers that have monitors. The tagging application manager can be used with other output peripherals. The computer 20 is further comprised of a keyboard 24 and mouse 26, both input peripherals that allow the user to provide input to the tagging application manager. It should be appreciated that operation of the tagging application manager is not dependent upon the use of a keyboard and mouse as the input peripherals. The tagging application manager can be adapted for use with other input peripherals, such as light pens and voice recognition peripherals.

With continuing reference to FIG. 1, when the computer 20 is executing the business document production application with the embedded tagging application manager, the business document production application is capable of being used to generate business documents, process business documents that were previously produced using the application and then saved, or produced by another instance of the application or a compatible application and imported into the application. In the illustrated embodiment, the business document production application is a Microsoft® Office application, such as Word or Excel, that allows the embedding of the tagging application manager via an event handler or similar structure. It should, however, be appreciated that the tagging application manager is capable of being adapted to be embedded in other business document production applications that provide the capability to embed the program. A business document that is processed by the business document production application typically incorporates data from many other computer sources, such as operational or financial systems, database, and other data sources. In addition, the user of the computer may provide data that is incorporated into the document via the keyboard or other input peripheral. In any event, the business document production application is capable of being used to produce a document that incorporates business data. The tagging application manager that is embedded within the business document production application is capable of being used to produce XBRL instance document and entity (typically, a company) extension taxonomies.

Figure 2:
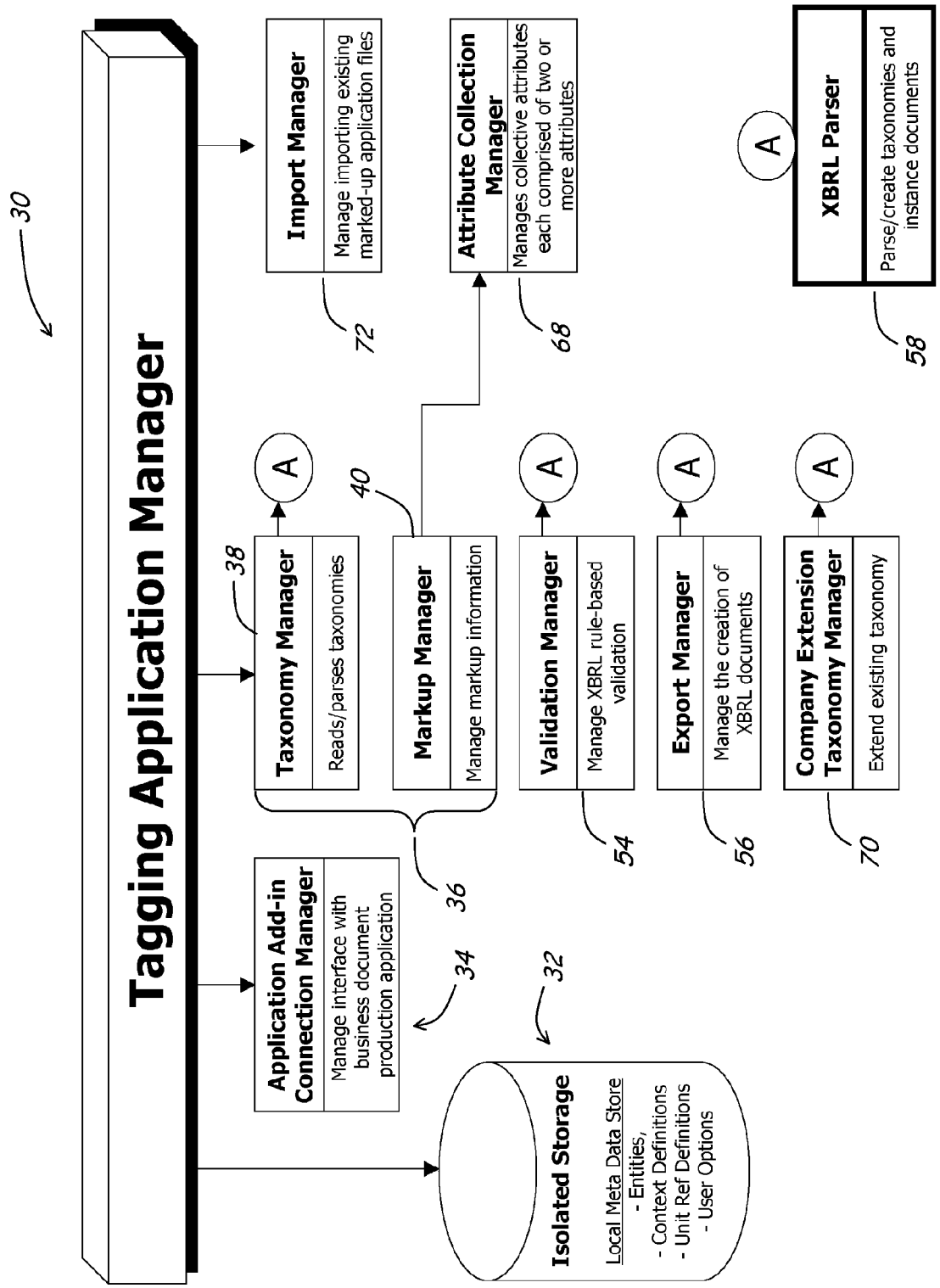
FIG. 2 is a block diagram of the embodiment of a tagging application manager.

With reference to FIG. 2, an embodiment of tagging application manager 30 is described in greater detail. The manager 30 is comprised of isolated or dedicated storage 32 for storing certain user specific metadata that is typically used by the manager from one session to the next. In the illustrated embodiment, the storage 32 is used to store entity names, context definitions, unit reference definitions, and user options. Typically, entities are the names of companies or individuals with which one or more XBRL instance documents that have been or are being produced using the manager are associated. Context definitions comprise calendar data, such as the various calendar periods that may be identified within an instance document. Unit reference definitions include the types of units that may apply to an instance document (e.g., dollars, yen, Euros, shares etc.), scaling, and precision definitions. User options define settings selected by the user of the manager that are other than the default settings. For example, the user options can include viewing options (e.g., background colors), export parameters, mark-up characteristics (e.g., the colors used to indicate a selected but untagged location and a selected and tagged location), and user or company extension taxonomies (i.e., taxonomy definitions that are not incorporated into a base or standardized taxonomy).

With continuing reference to FIG. 2, the manager 30 is further comprised of an add-in connection manager 34 that is used to embed the manager 30 within the business document production application. In the illustrated embodiment, the manager 34 is adapted to communicate with an operating system event handler, an application program interface utility that manages communications between the manager 34 and a business document production application, such as Microsoft® Word and Excel. It should be appreciated that the add-in connection manager 34 is capable of being adapted to communicate with other business document production applications that support embedding via a utility that achieves the same function as the event handler. In operation, the add-in connection manager 34 and the event handler cooperate such that when the business document production application is executed or run by the processor in the computer, the tagging application manager is available for use within the business production application manager. In the illustrated embodiment, the tagging application manager is typically accessed via clicking the mouse 26 on an icon for the manger 30 that is established in the business document production application. Once the manager 30 is accessed, a windows-style interface is established on the monitor 22 that allows the user to interact with the other features or utilities associated with the manager 30. It should be appreciated that access to the manager 30 can be provided in many other ways, such as by the user typing in an appropriate command. It should also be appreciated that the function of the add-in connection manager 34 can take other forms in embodiments of the invention in which the manager is native or co-resident with the business document production application.

With continuing reference to FIG. 2, the manager 30 is further comprised of a taxonomy attribute linker 36 that is comprised of a taxonomy manager 38 and a mark-up manager 40. The taxonomy manager 38 and mark-up manager 40 cooperate or interact with one another in a manner that allows an attribute associated with a taxonomy to be associated with a location in a business document that is being processed by the business document production application. More specifically, the taxonomy manager 38 operates to provide an interface to the monitor 22 that allows the user to select an XBRL taxonomy if more than one taxonomy is available and view a user-selected portion of an XBRL taxonomy on the monitor 22. An XBRL taxonomy is a dictionary comprised of attributes or elements for data that is commonly incorporated into business documents. For example, an XBRL taxonomy may include a net profits attribute or element that is identified by the tag or label "net profit" and that, when associated with a location in a business document, indicates that any data present in that location is defined to be data that reflects a net profit. The mark-up manager 40 operates so as to allow the user to select an attribute from the taxonomy and associate the selected attribute with a particular location or target range in the document.

Figure 3A:
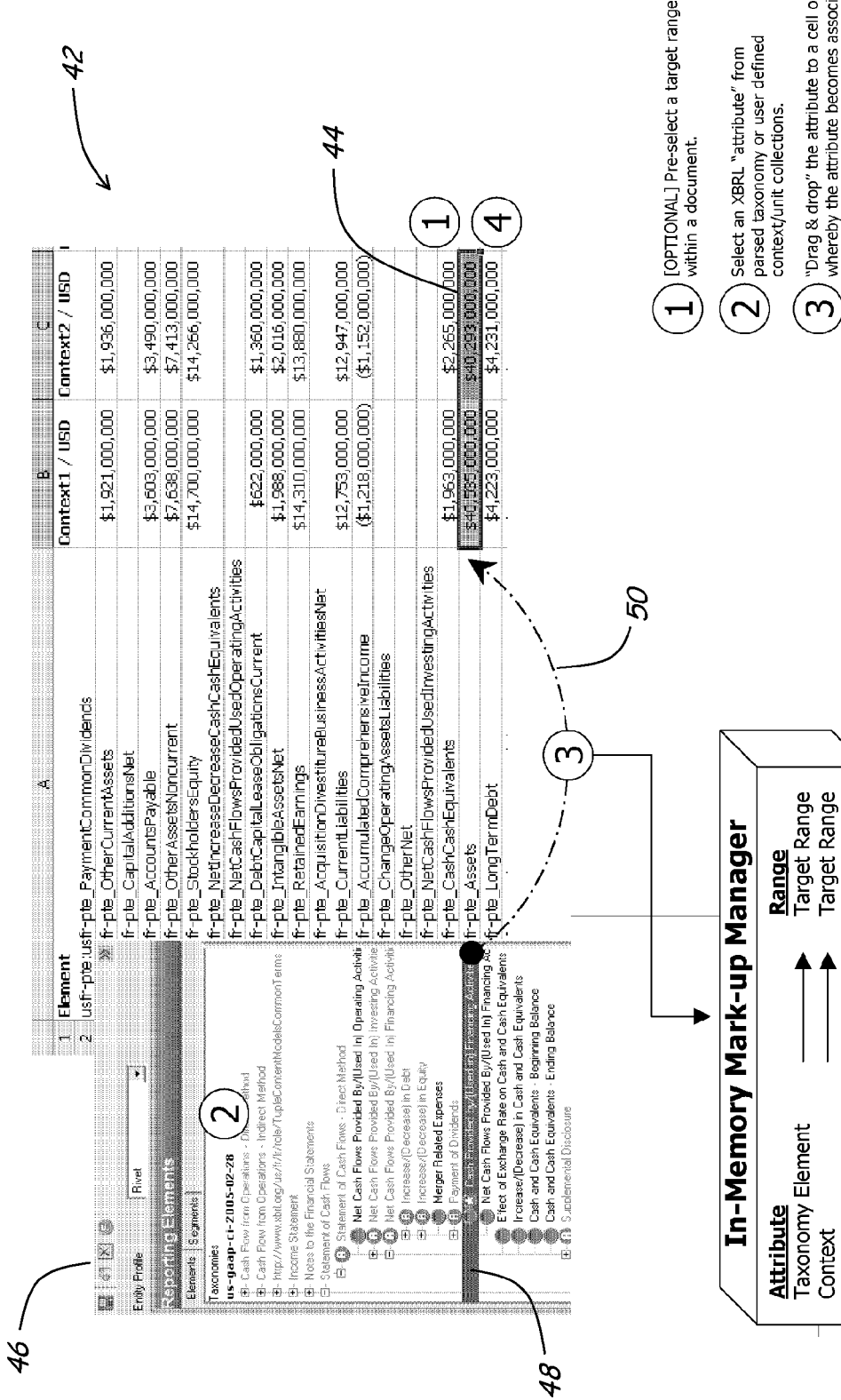
FIG. 3A illustrates the operation of a taxonomy attribute linker associated with the tagging application manager in associating an attribute of a taxonomy with a location or target range within a business document that is being processed by a business document production application.

FIG. 3A provides an example of the operation of the taxonomy manager 38 and mark-up manager 40 in associating an attribute from an XBRL taxonomy with a location or target range within an Excel spreadsheet business document. Initially, it is assumed that an Excel business document is being processed by the Excel application and a portion 42 of the document that includes a location or target range with which the user want to associate an attribute or element is visible to the user on the monitor 22. Next, the user interacts with the markup manager 40 to identify the location or target range 44 in the Excel document with which an attribute is to be associated. In the illustrated example, the user utilizes the mouse 26 to highlight a target range of two cells within the spreadsheet as the locations with which an attribute is to be associated. If the taxonomy manager 38 has not already been used to present at least a portion of an XBRL taxonomy 46 that includes the attribute or element that the user wants to associate with the location or target range in the document on the monitor 22, the taxonomy manager 38 is used to present the portion of the XBRL taxonomy 46 on the monitor 22. The user then interacts with the mark-up manager 40 to identify 48 the attribute of the taxonomy that is to be associated with the selected location or target range within the displayed portion 42 of the document by appropriate manipulation of the mouse 26. Finally, the mark-up manager 40 and the user, via manipulation of the mouse 26, interact so as to "drag and drop" the attribute on the selected location or target range within the displayed portion of the document. In the illustrated example, the "Cash Provided by/(Used In) Financing Activities" attribute is associated with the selected two cells of the target range. Typically, the association of a XBRL taxonomy attribute with a location or target range within a document requires that one or more other attributes that are not necessarily associated with the XBRL taxonomy also be associated with the location or target range. In the illustrated example, context and unit attributes are also associated with the locations or target range via the same process as noted with respect to the noted XBRL attribute. Once at least one attribute has been associated with a business document, the document is considered to be a marked-up document.

With reference to FIG. 2, the tagging application manager 30 is further comprised of a validation manager 54 that is available to the user for validating a marked-up document prior to the generation of an XBRL instance document. Operation of the validation manager 54 is initiated via the windows-style interface that is produced on the monitor after the user accesses the tagging application manager 30. Validation of a marked-up document comprises (a) validation of the attribute or attributes associated with a location or target range, (b) validation of the numeric data at a location or target range with which an attribute has been associated, and (c) document-level validation. In the case of validation of the attribute or attributes associated with a location or target range, the validation manager 54 operates to determine: (a) if all of the attributes that need to be associated with the data at a location or target range in the document have been associated with the location or target range and (b) if an attribute has been associated with a location or target range in the document that should not be associated with the location or target range. In the case of validation of numeric data, the validation manager 54 considers each occurrence of marked-up or tagged numeric data in the business to determine whether the numeric data is acceptable or unacceptable based upon the calculation rules identified in the XBRL taxonomy and provide the user with feedback on the results of the validation. For instance, if the amount identified with a "cash" attribute and the amount identified with a "money market" did not add up to the amount identified for "cash and cash equivalents, total" attribute, the validation manager would provide the user with an indication that there was an error with the marked up data. In the case of document level validation the validation manager 54 considers whether unique markup rules per the relevant XBRL taxonomy have been violated. For instance, the validation manager 54 may assess whether there are two or more different values with which the same XBRL attribute has been associated. An example of this would be when a "cash for the first quarter" attribute is associated with data values of 25,000 and 30,000, which renders the document invalid. It should be noted that, due to the integrated nature of the tagging application manager 40, the user is able to use the validation manager 54 to validate a marked up document during the same session that the user employs the other features of the tagging application manager 30, such as the taxonomy attribute linker 36 to markup documents and the export manager 56 to produce XBRL instance documents.

Figure 3B:
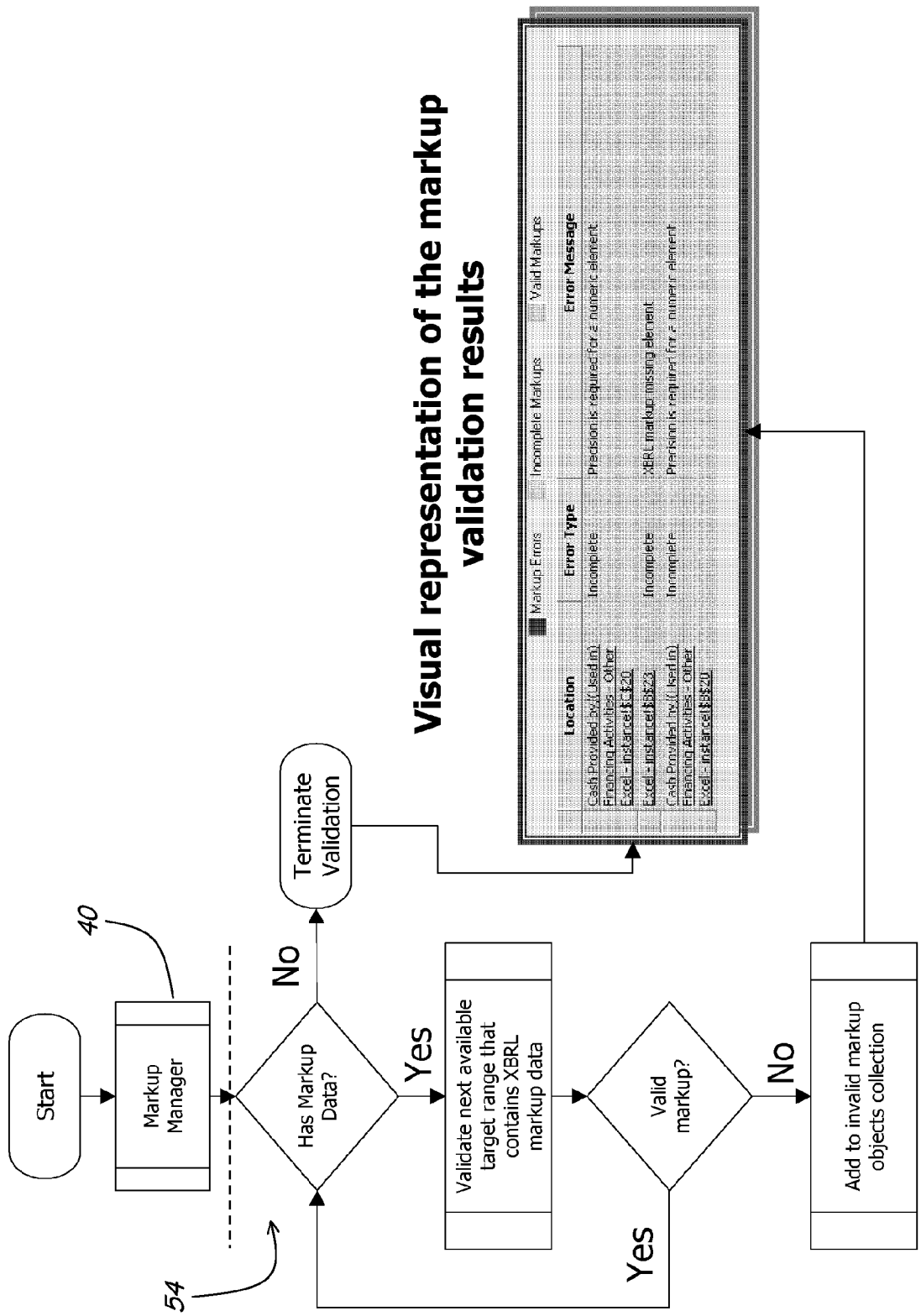
FIG. 3B illustrates the operation of the validation utility portion of the program in validating any mark-ups or associations of attributes with a location or target range within a business document.

FIG. 3B provides an example of the operation of the validation manager 54 in validating the attribute or attributes associated with each tagged location or target range in the document. As previously noted, operation of the validation manager 54 is initiated by the user interacting with the windows-style interface that is presented on the monitor 22 after the manager 30 is accessed. As shown in FIG. 3B, the user interaction with the windows-style interface to initiate mark-up validation of the document is processed by the mark-up manager 40 calling the validation manager 54. In response, the validation manager 54 proceeds to search the document for a marked-up location or target range. With respect to a marked up location or target range, the validation manager determines if the markup is invalid or valid. A markup is invalid: (a) if all of the attributes that need to be associated with a location or target range in the document have not yet been associated with the location or target range (i.e., the markup is incomplete), or (b) if an attribute has been associated with a location or target range in the document that should not be associated with the location or target range (i.e., the markup is in error). If the validation manager 54 determines that the markup associated with a location or target range in the document is incomplete and/or in error, the location of the error, error type (incomplete/in error), and appropriate message are added to a table that is subsequently displayed to the user on the monitor 22. If the markup is not incomplete and not in error, no further action is taken with respect to the markup. After the validation manager has determined that the markup was invalid or valid and added the appropriate information to the table in the case of an invalid error, the validation manager proceeds to search the document for another markup. If another mark-up is identified, the validation manager 54 again determines whether the markup is valid or invalid and, in the case of an invalid markup, adds the appropriate information to the table. The validation manager 54 proceeds in this fashion until each of the marked up locations or target ranges in the document have been analyzed to determine whether the markup is invalid or valid. If, after all of the marked up locations have been analyzed, there are one or more entries in the table, the table is displayed to the user on the monitor. The user is also able to print out the table. If, after all of the marked up location have been analyzed, there are no entries in the table, a note is displayed on the monitor to inform the user that the document is valid with respect to the attribute or attributes associated with each tagged location or target range in the document.

Figure 3C:
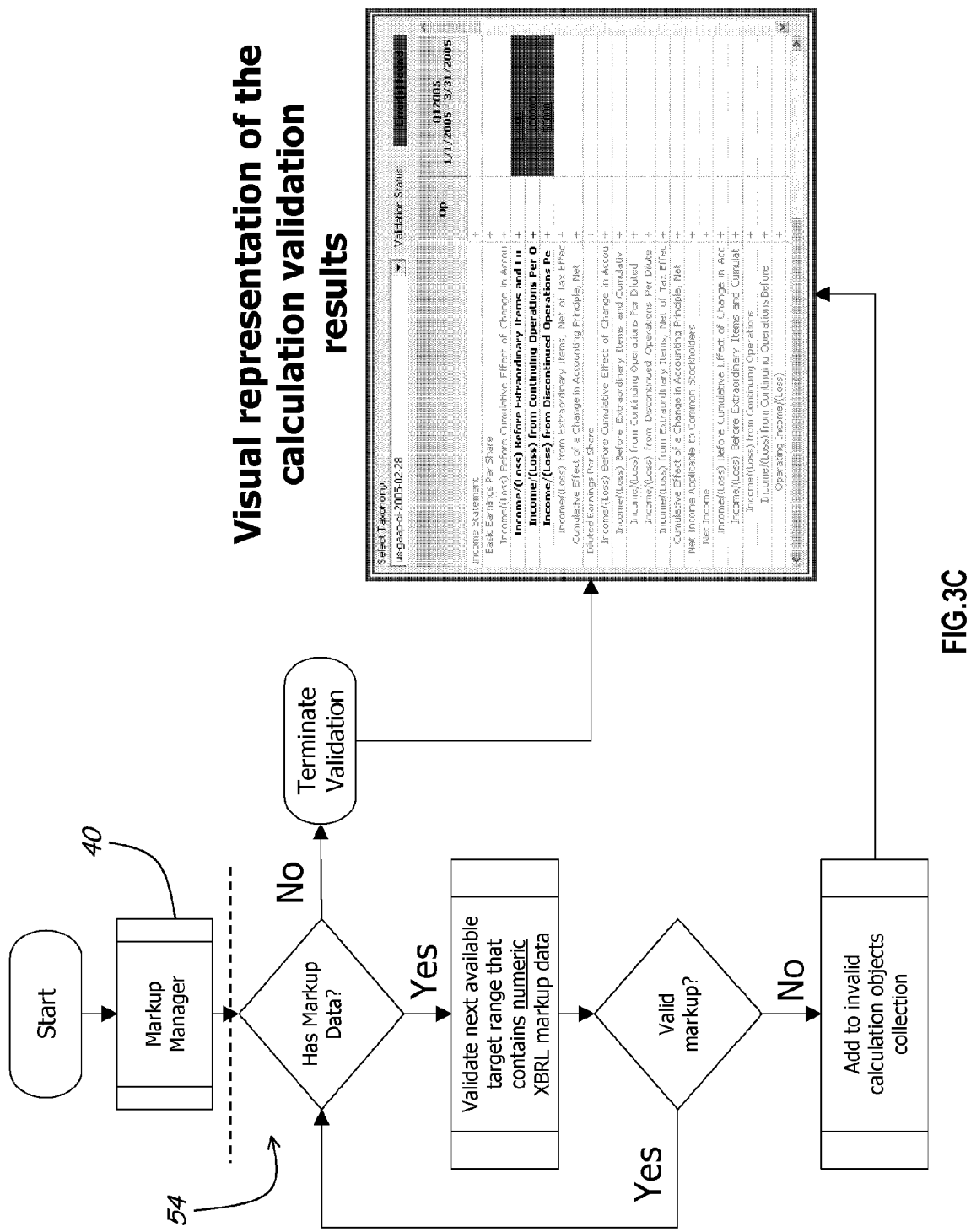
FIG. 3C illustrates the operation of the validation utility portion of the program in validating any numeric data that is associated with an attribute.

FIG. 3C provides an example of the operation of the validation manager 54 in validating the numeric data associated with each tagged location or target range in the document. As previously noted, operation of the validation manager is initiated by the user interacting with the windows-style interface that is presented on the monitor 22 after the manager 30 is accessed. As shown in FIG. 3C, the user interaction with the windows-style interface to initiate numeric validation of the document is processed by the mark-up manager 40 calling the validation manager 54. In response, the validation manager 54 proceeds to search the document for a marked-up location or target range that contains numeric data. With respect to a marked up location or target range that contains numeric data, the validation manager 54 determines if the numeric data is valid. Numeric data is invalid: (a) if the sign associated with the data does not agree with the attribute and/or the sign of the data with which a parent attribute is associated (e.g., negative numeric data that is tagged as profit) or (b) if the value of the numeric data does not agree with other tagged numeric data or calculations based upon other tagged numeric data (e.g., the amount identified with a "cash" attribute and the amount identified with a "money market" attribute do not add up to the amount identified with a "cash and cash equivalent total" attribute. If the validation manager 54 determines that the numeric data associated with a location or target range in the document is or appears to be in error, numeric data and associated attribute are added to a table that is subsequently displayed to the user on the monitor 22. If the numeric data is not or does not appear to be in error, no further action is taken with respect to the numeric data. After the validation manager has determined that the numeric data associated with a particular location or target range is invalid or valid and added the appropriate information to the table in the case of an error or apparent error, the validation manager proceeds to search the document for another occurrence of marked up numeric data. If another instance of mark-up numeric data is identified, the validation manager 54 again determines whether the numeric data is valid or invalid and, in the case of an numeric data that is in error or apparently in error, adds the appropriate information to the table. The validation manager 54 proceeds in this fashion until each instance of marked up numeric data has been analyzed to determine whether the numeric data is invalid or valid. If, after all of the marked up numeric data has been analyzed, there are one or more entries in the table, the table is displayed to the user on the monitor. The user is also able to print out the table. If, after all of the marked up location have been analyzed, there are no entries in the table, a noted is displayed on the monitor to inform the user is that the document is valid with respect to the attribute or attributes associated with each tagged location or target range in the document.

With reference to FIG. 2, the tagging application manager 30 is further comprised of an export manager 56 that processes a marked-up business document to: (a) produce an XBRL instance document that conforms to the XBRL Specification or standard, as such, is capable of being processed by other XBRL applications that also conform to the specification or standard, and (b) transmit the XBRL instance document to a recipient. Operation of the manager is initiated via the windows-style interface that is produced on the monitor after the user accesses the tagging application manager 30. Generally, the export manager 56 operates so as to identify the marked up data in the document of interest, format the marked up data according to the XBRL specification, serialize the formatted data to create the XBRL instance document, and cause the XBRL instance document to be transmitted to a recipient. It should be noted that, due to the integrated nature of the tagging application manager 40, the user is able to use the export manager 68 to produce XBRL instance documents and export such documents during the same session that the user employs the other features of the tagging application manager 30, such as the taxonomy attribute linker 36 to markup documents and the validation manager 54 to validate marked up documents.

Figure 3D:
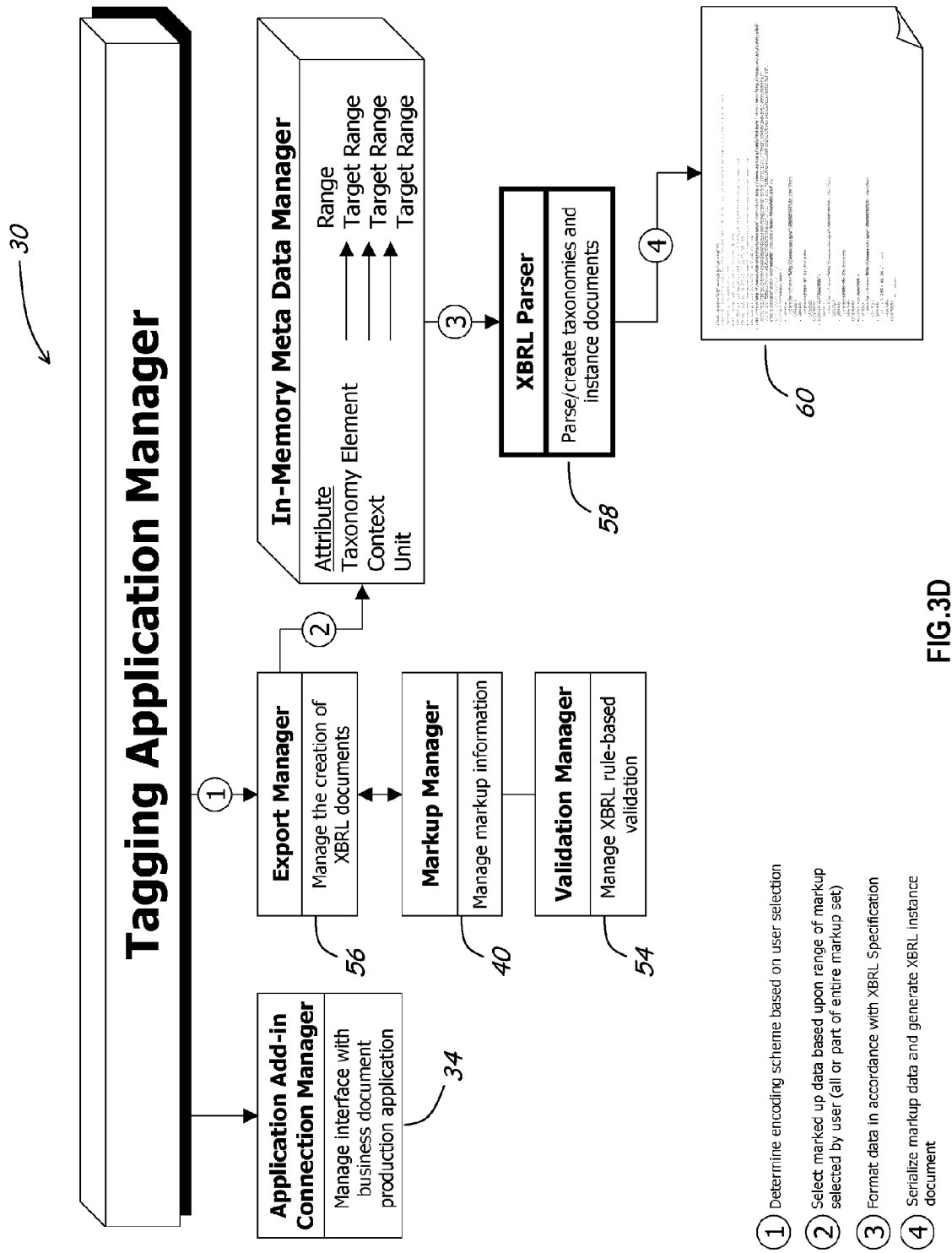
FIG. 3D illustrates the operation of the export manager portion of the program in generating an XBRL instance document from a business document that has been marked-up or tagged such that at least one complete set of required attributes is associated with a location or target range within the document.

FIG. 3D provides an example of the operation of the export manager 56 in producing an XBRL instance document that is suitable for transmission to an XBRL-enabled recipient. Initially, the user identifies to the export manager the desired encoding scheme for the instance document. Presently, two encoding schemes are available, Eight-bit Unicode Transformational Format (UTF-8) and ASCII, although other encoding schemes are possible. The user also identifies the marked up data in the document that is to be processed to generate the instance document. The export manager 56 uses the markup manager 40 to locate all of the marked up data in the document that is to be processed to generate the XBRL instance document. The export manager 56 also uses the validation manager 54 to ensure that only valid marked up data is processed in generating the XBRL instance document. If the validation manager 54 identifies invalid data, a message is displayed on the monitor and the user is given options as to how to proceed, including the option of exporting whatever portion of the marked up data is valid. The attribute or attributes associated with each of the selected marked-up data are, pursuant to the XBRL Specification, formatted for processing by an XBRL parser 58 (see FIG. 2). The XBRL parser 58 operates to translate the formatted and marked up data into an XBRL instance document, such as document 60, suitable for processing by any XBRL application that conforms to the XBRL Specification.

Figure 3E:
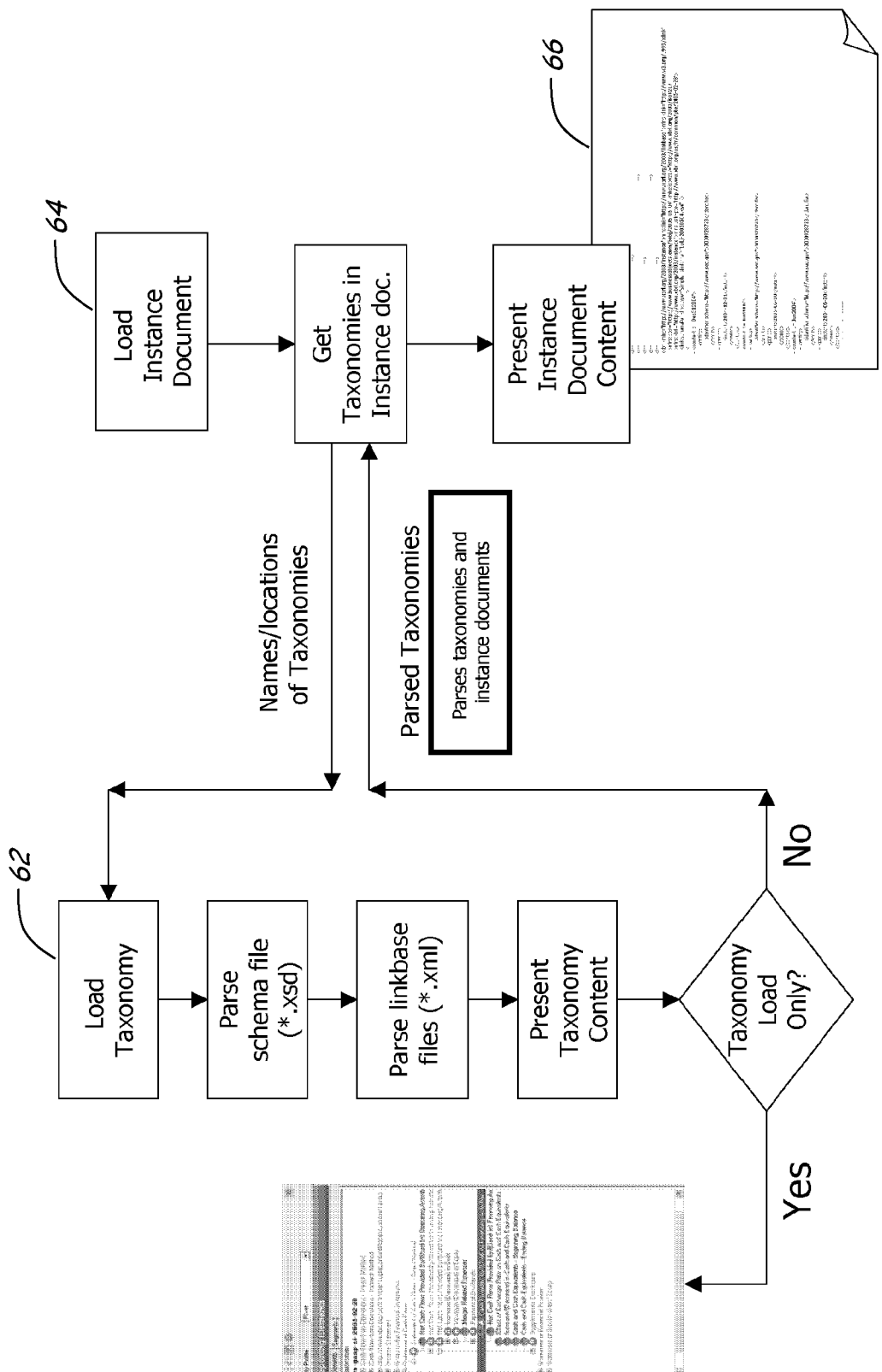
FIG. 3E illustrates the operation of the XBRL parser portion of the program.

With reference to FIG. 2, the tagging application manager 30 is further comprised of an XBRL parser 58 that operates to: (a) generate or create a taxonomy that is available to the user or (b) both create a taxonomy and generate and XBRL instance document based on the taxonomy. The parser 58 is used by each of the taxonomy manager 38, validation manager 54, and export manager 56 in performing their respective functions. FIG. 3E illustrates the operation of the parser 58. If the only output required of the parser 58 is the generation of an XBRL taxonomy that can be displayed on the monitor 22 and used in tagging attributes to locations or target ranges in a document, operation of the parser begins with a step 62 in which the taxonomy file of interested is accessed. Subsequently, the schema file and linkbase files that provide the underlying definition of each attribute or element in the taxonomy file are parsed to establish the entire present or current, fully defined taxonomy. This taxonomy is then displayed on the monitor 22 and made available to the user via the windows-style interface that is presented on the monitor 22 after the user selects the tagging application manager 30 within the business document production application. If the parser 58 is needed to generate an instance document, operation of the parser 58 commences with a step 64 in which an instance document is accessed or loaded, the instance document at this point is the formatted file produced when the attribute or attributes associated with each of the selected marked-up data are formatted pursuant to the XBRL specification, as discussed with respect to FIG. 3D. The formatted file identifies the taxonomy or taxonomies that were used in tagging locations or target ranges within the relevant business document. Each of the identified taxonomies is then accessed and established beginning with step 62. After all of the identified taxonomies have be accessed and established, the parser 58 operates to apply each of the identified taxonomies to the formatted instance document to produce a present instance document, such as instance document 66, that is suitable for export.

Figure 3F:
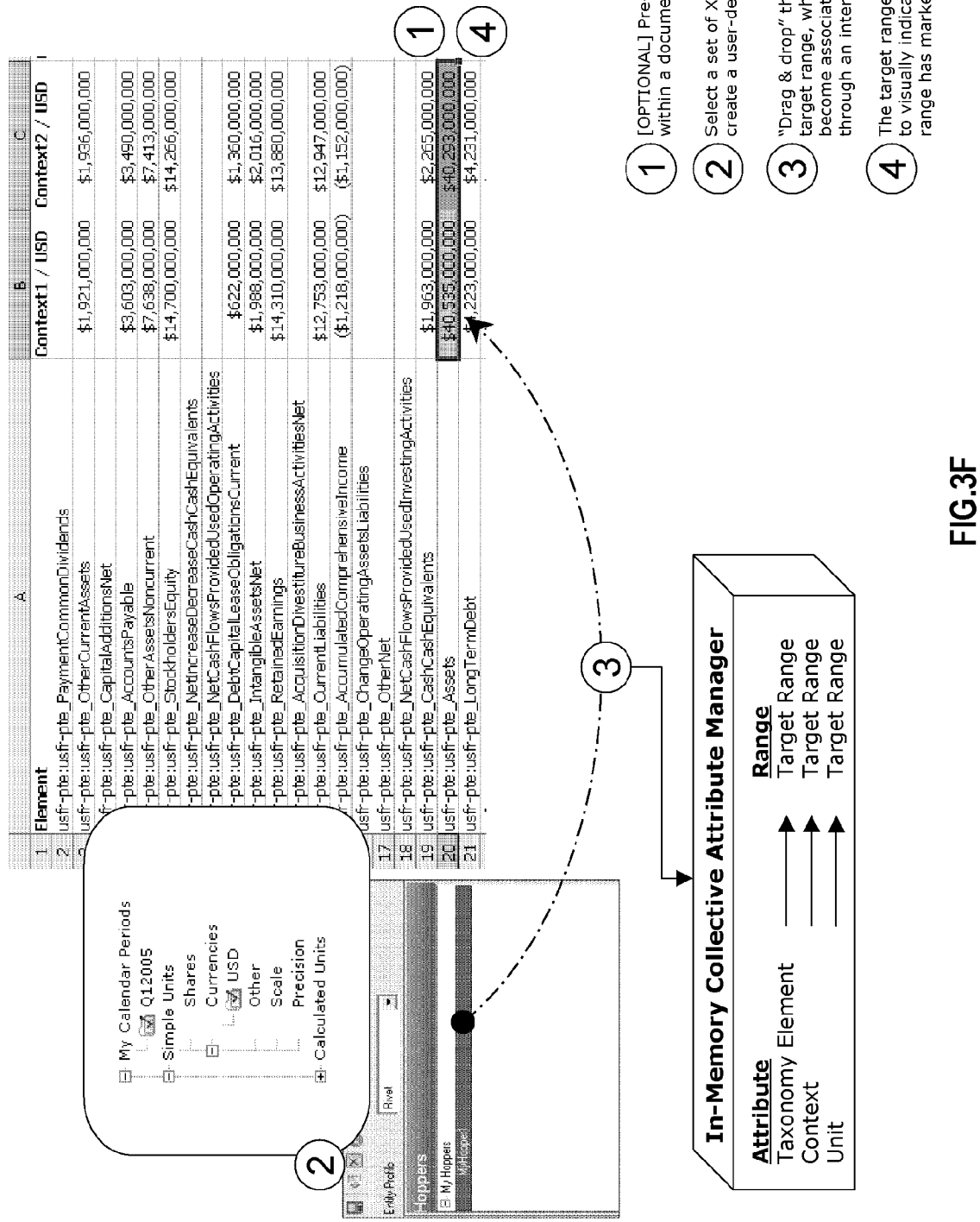
FIG. 3F illustrates the use of a collective attribute that is a particular type of attribute that is defined to include two or more pre-existing XBRL attributes.

With reference to FIG. 2, the tagging application manager 30 is further comprised of an attribute collection manager 68 that allows a user to interact with the windows-style interface to define a new attribute that is comprised of two or more previously defined non-XBRL attributes and make the new attribute available to the user for tagging locations or target ranges within a business document. For example, the new attribute can be comprised of a context attribute (e.g., a particular calendar period) and a unit attribute (e.g., US dollars). FIG. 3F illustrates the operation of the attribution collection manager 68, which is called by the markup manager 40, in associating an attribute with the label "MyHopper" with two cells within an Excel spreadsheet. The "MyHopper" labeled attribute is comprised of a calendar period attribute that is defined as the first quarter of 2005 and a unit attribute that is defined as the US dollars. New attributes defined using the attribute collection manager 68 are associated with locations or target ranges in business documents in substantially the same way that taxonomy attributes and other attributes are individually associated with such locations and target ranges. Since the way in which individual attributes are associated with locations and target ranges in a document was previously discussed with respect to FIG. 3A, the associated of new attributes comprised of two or more attributes will not be described further. It should be noted that, due to the integrated nature of the tagging application manager 40, the user is able to use the attribution collection manager 68 to define collective attributes during the same session that the user employs the other features of the tagging application manager 30. As a consequence, the user can create a collective attribute and immediately make use of the collective attribute in a document that the user is or wants to mark up during the current session of the manager 30.

Figure 3G:
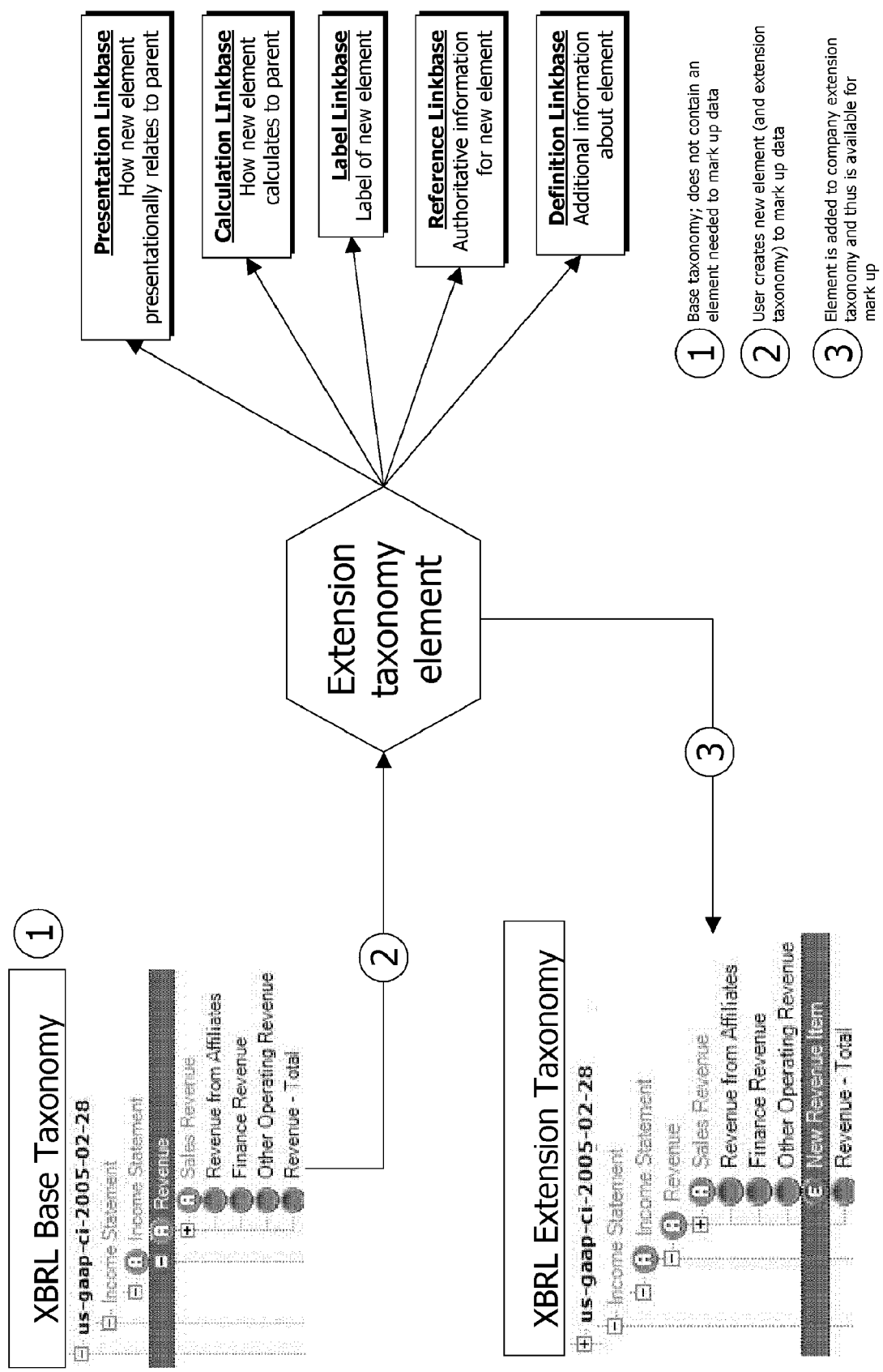
FIG. 3G illustrates the operation of the extension manager portion of the program that allows a user to add an attribute to a taxonomy.

With reference to FIG. 2, the tagging application manager 30 is also comprised of an extension taxonomy manager 70 that allows a user to define a new attribute or element for an entity/company extension taxonomy that the user can use to supplement an XBRL taxonomy and make the new attribute available to the user for tagging locations or target ranges within a business document. FIG. 3G illustrates the operation of the extension taxonomy manager 30. Initially, the XBRL base taxonomy to which a new XBRL attribute or element is to be added is identified. The user then interacts with the windows-style interface to define the new attribute or element. Specifically, the user interacts with the extension to taxonomy manager 70 to: (a) specify how the new element is going to be presented within the company extension taxonomy relative to the XBRL base taxonomy, i.e., specify the location of the new attribute within the XBRL base taxonomy in a presentation linkbase; (b) specify how the new element that is a numeric element is related or calculated in a calculation linkbase; (c) specify labeling information for the new element in a label linkbase; (d) specify authoritative information for the new element in a reference linkbase; and (e) specify additional information about the new element in a definition linkbase. Once the user has entered all of the information needed to define the new element, the label for the new element or attribute is added to the company extension taxonomy and positioned within the context of the attributes or elements derived from or imported from the XBRL base taxonomy. As a consequence, the new attribute or element is available to be associated with a location or target range within a business document. It should be noted that, due to the integrated nature of the tagging application manger 40, the user is able to use the extension taxonomy manager 68 to define new attributes during the same session that the user employs other features of the tagging application manager 30, such as the taxonomy attribute linker 36 to markup documents. As a consequence, the user can define a new attribute and immediately make use of the new attribute in a document that the user is or wants to mark up during the current session of the manager 30.

With reference to FIG. 2, the tagging application manager 30 is further comprised of an import manager 72 that provides the user with the ability to import marked-up business documents that were not created during the current session of the manager 30. Consequently, the import manager 72 provides the ability to import business documents that were marked up during a previous session of the tagging application manager 30 and that require additional work before being used to generate an XBRL instance document or marked-up business documents produced by an application other than the tagging application manager 30 or another instance of the manager 30. The import manager 72, like the other features of the manager 30, can be used to import documents during the same session in which other features of the manager 30 are or may be utilized.

Figure 4:
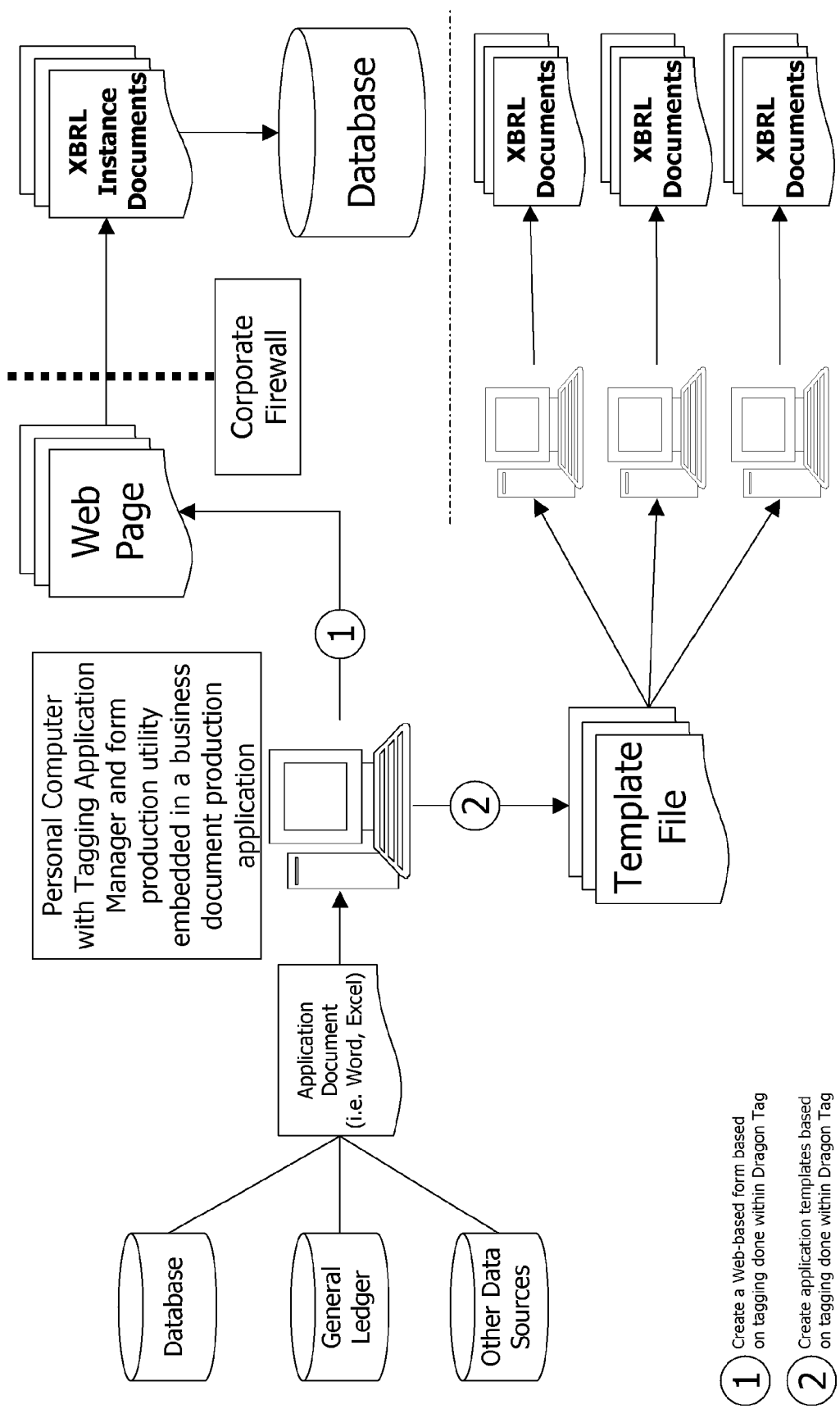
FIG. 4 is a block diagram of a computer environment in which an embodiment of the program that facilitates the production of a web form or template form that includes XBRL and that can be presented to an outside entity so that the entity can provide the data that is associated with at least one location in the form with which an attribute has been associated, and once provided, used to generate an XBRL instance document.
Figure 5:
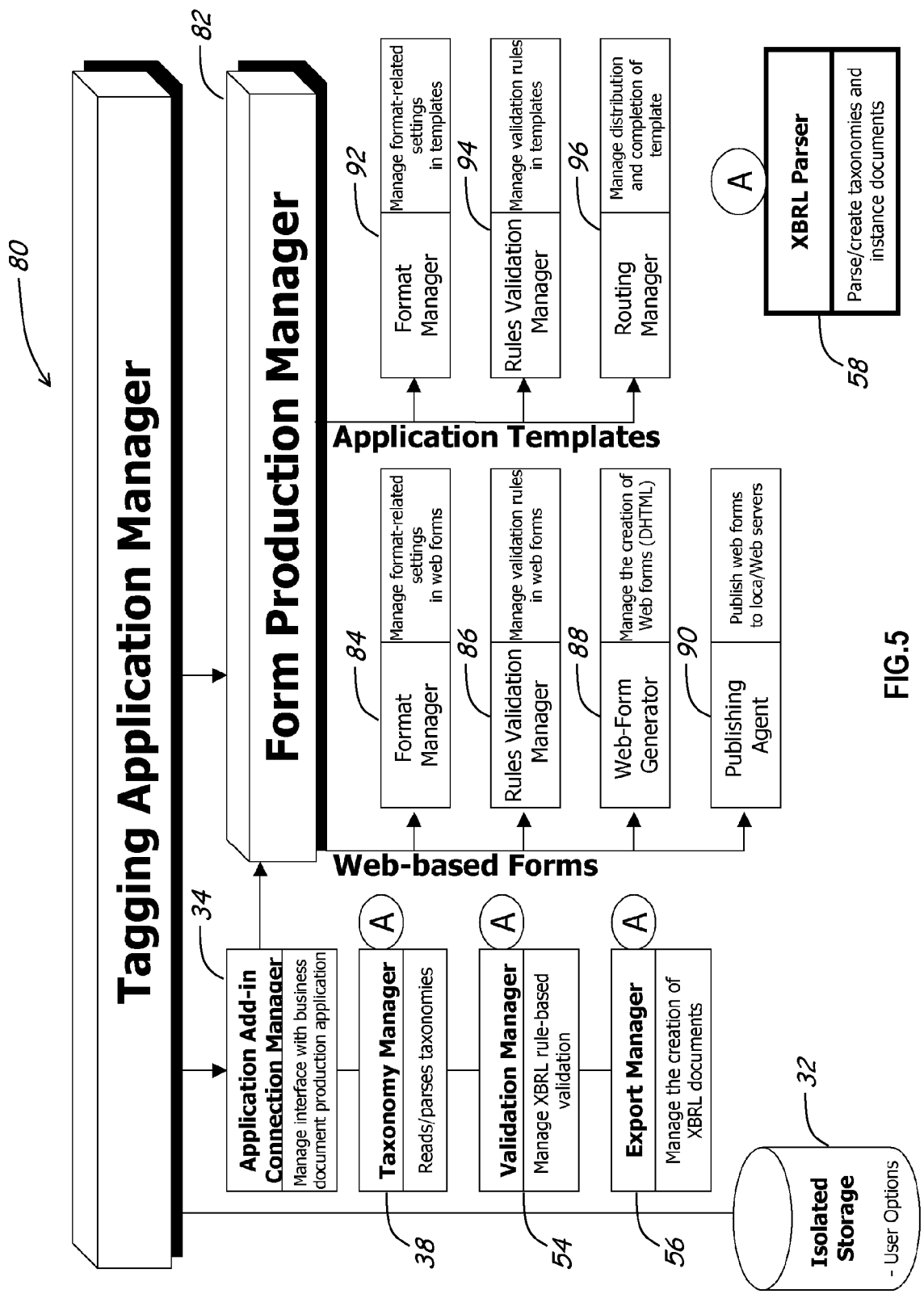
FIG. 5 is a block diagram of an embodiment of the tagging application manager that comprises the ability to generate web forms and template forms.

With reference to FIGS. 4 and 5, a second embodiment of a tagging application manager is described that provides the additional capability of being able to generate a marked-up web form into which an outside entity can enter data into the marked up locations. The marked-up form populated with data can then be used to generate XBRL instance documents. In the illustrated embodiment, two types of forms can be generated, a web-based form that an outside entity accesses via the Internet and a template file that is broadcast to one or more outside entities (e.g., other users or consumers). In the case of a web-based form, the outside entity accesses the web-page on which the form is located to create an instance of the form that is associated with the outside entity, provides the data requested by the form, and then submits the instance of the data populated form, which is now a marked-up document that is in the appropriate form for processing by the export manager 56 to produce an XBRL instance document, for processing. In the case of a template file, the template file is provided to an outside entity via an attachment to e-mail or any other convenient means. The outside entity opens the template file, populates the template file with requested data, and then submits the data populated template file that is in the appropriate form for processing by the export manager 56 to produce an XBRL instance document.

With reference to FIG. 5, the second embodiment of the tagging application manager 80 is described. The manager 80 preferably comprises all of the components described with respect to the tagging application manager 30. However, for simplicity, only a subset of the components of the manager 30 is illustrated. The manager 80 is further comprised of a form production manager 82 that is capable of generating web-based forms and template forms in which one or more locations or target ranges within a form are tagged with attributes but no data is present in these locations. The tagging application manager 80 is embedded in a business document production application that is capable of being used to produce a business document. The production of a form commences with the creation of a business document that is to be the basis for a form in the business document production application or the importing of a business document that is to be the basis for a form into the business document production application. In either case, locations or target ranges within the document are tagged with the appropriate attribute or attributes. However, at least one and typically several locations or target ranges within the document do not contain any data and, as such, are the basis for the "blanks" in the form that is to be subsequently produced. Once the document has been appropriately marked-up and validated, the user causes the document to be applied to the form production manager 82 by appropriate interaction with the windows-style interface that is provided after the tagging application manager 80 is accessed within the business document production application. The user also makes a choice as to whether a web-based form or an application template form is to be generated.

In the case of a web-based form, the marked-up document is initially applied to a format manager 84 that allows the user to specify how the web form is to look, i.e., locations of the blanks, colors, shading etc. The formatted document is subsequently applied to a rules validation manager 86 that queries the user as to rules that should be applied to each blank in the form. For example, a particular blank may require numeric data. In such a case, the rules validation manager 86 causes a rule to be associated with the blank that alerts an outside entity that has entered non-numeric data into the blank in the resulting web-form and informs the outside entity that only numeric data can be entered in the blank. The formatted form with embedded rules associated with each of the blanks is subsequently applied to a web-form generator 88 that converts the form into a technical format accessible via the Internet, such as HTML or DHTML. The web-form is then provided to a publishing agent 90 that pushes the web-form to a web-server. The web form is then available to one or more outside entities via the Internet. In this regard, an outside entity can access the form and populate the form with data, thereby producing a web-form with marked-up data. The XBRL code within the web-form allows the web-form to produce an XBRL instance document.

In the case of a template form, the marked-up document is initially applied to a format manager 92 that allows the user to specify how the template form is to look, i.e., locations of the blanks, colors, shading etc. The formatted document is subsequently applied to a rules validation manager 94 that queries the user as to rules that should be applied to each blank in the form. For example, a particular blank may require numeric data. In such a case, the rules validation manager 86 causes a rule to be associated with the blank that will alert an outside entity that has entered non-numeric data into the blank in the resulting template form and informs the outside entity that only numeric data can be entered in the blank. The formatted template form with embedded rules associated with each of the blanks is subsequently applied to a routing manager 96 that pushes the template form to outside entities. Once an outside entity has populated the template form with data, the template form can be returned and processed by the export manager 56 to produce an XBRL instance document.

Figure 6:
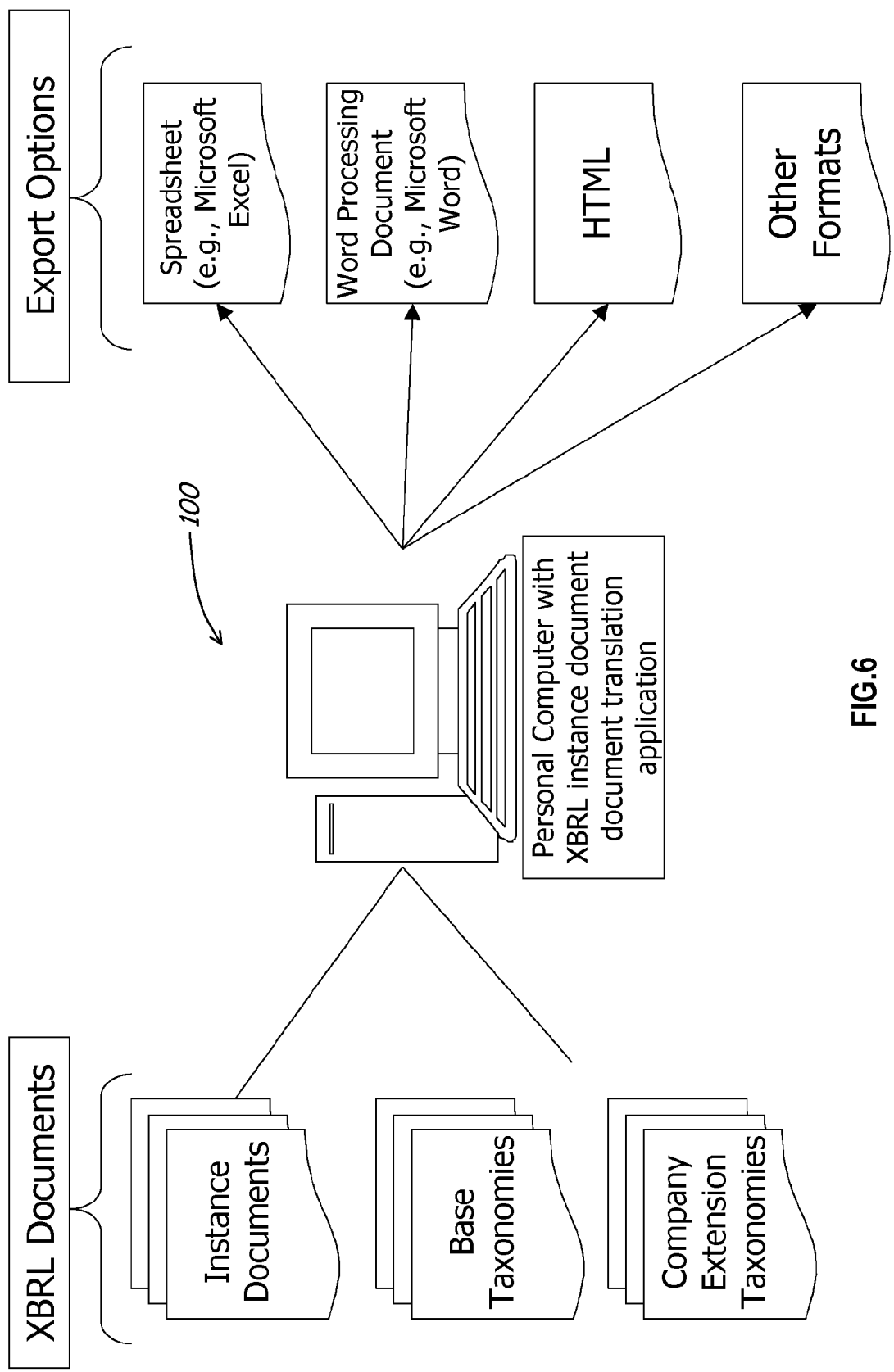
FIG. 6 is a block diagram of a computer environment in which an XBRL translation program is provided that allows an XBRL document to be translated into a viewable format that is likely to be easier for individuals that are not familiar with the XML/XBRL programming languages or that do not have the time or inclination to become familiar with such languages.
Figure 7:
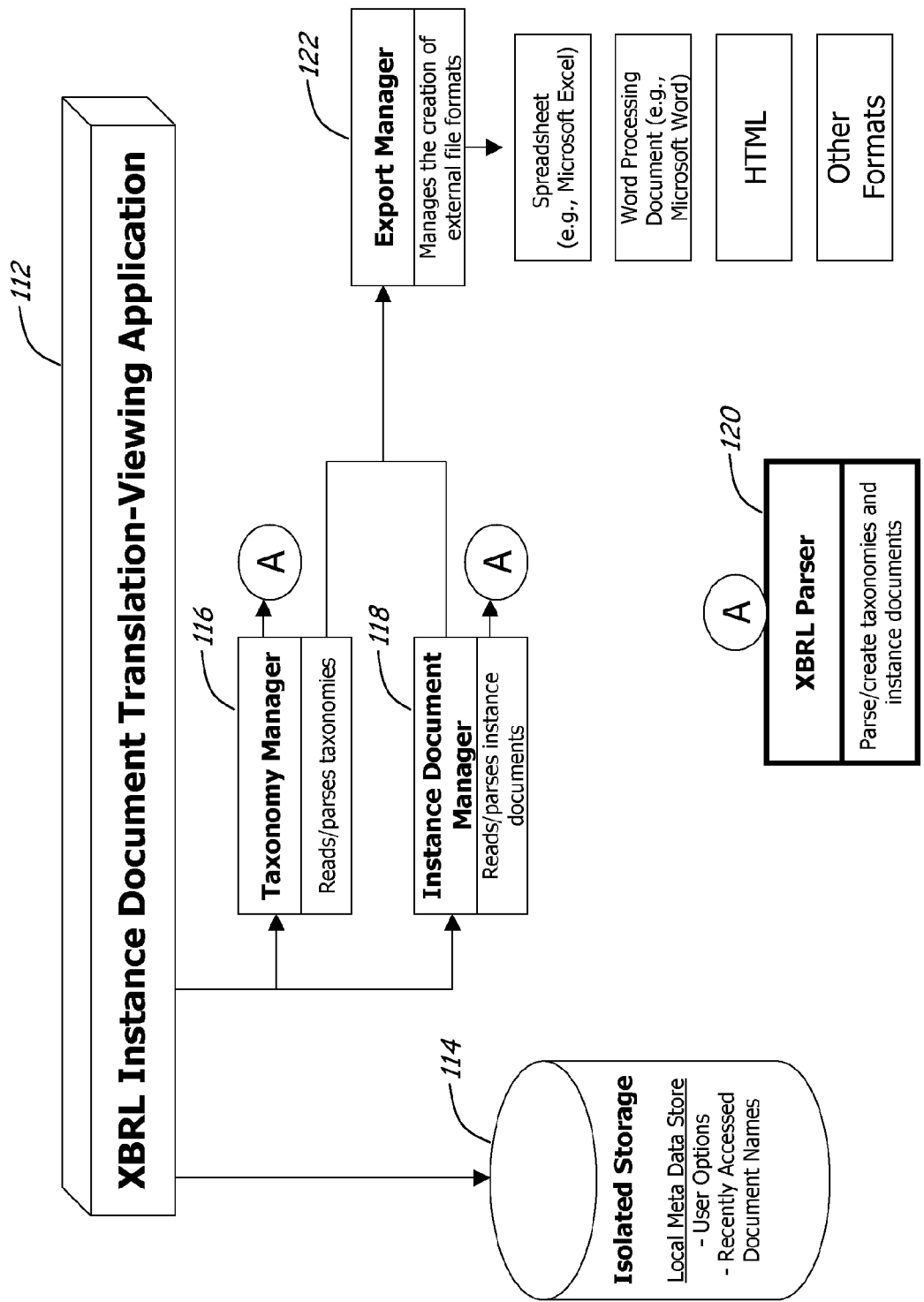
FIG. 7 is a block diagram of an embodiment of an XBRL translation program.
Figure 8:
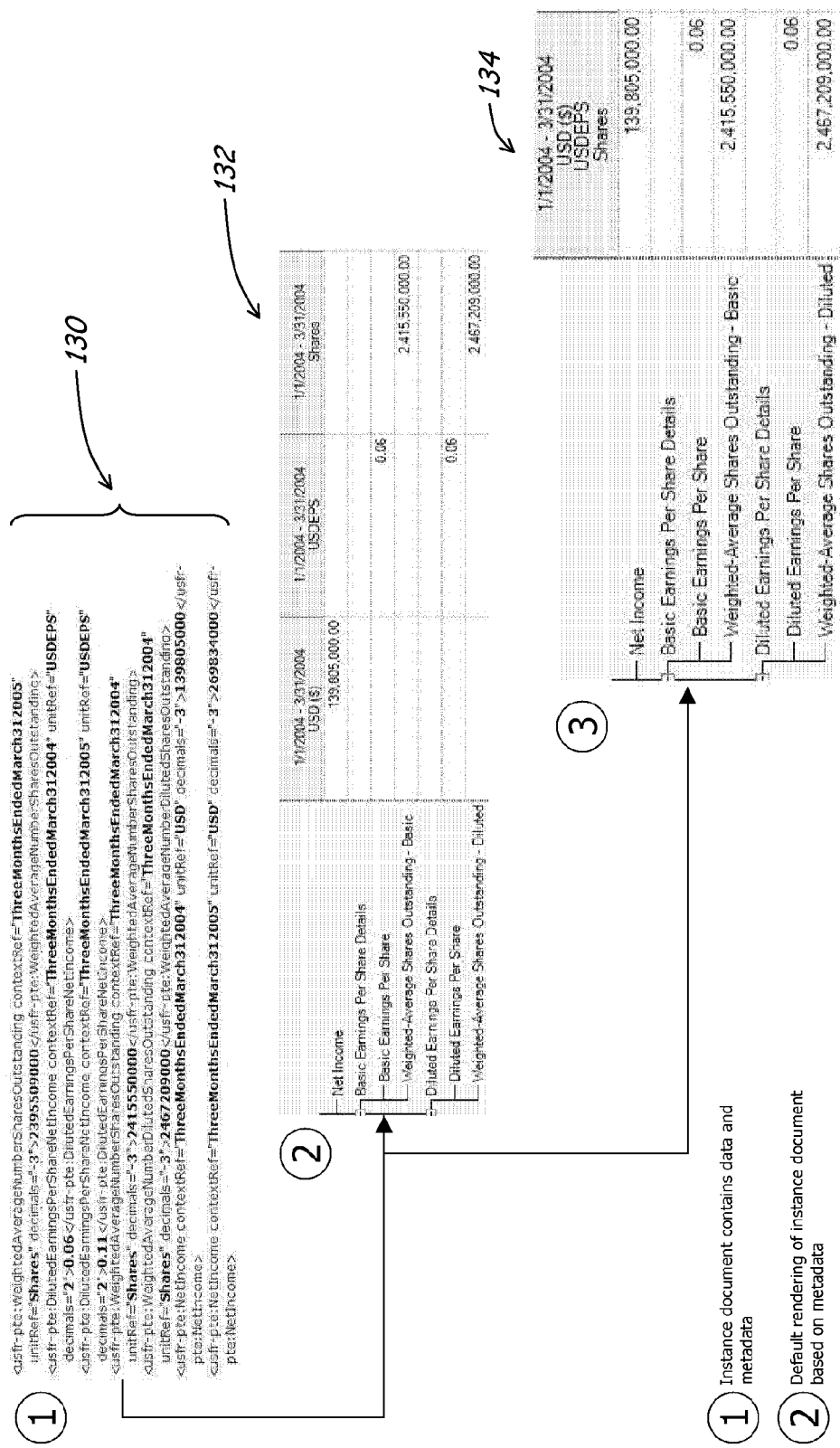
FIG. 8 illustrates the operation of the XBRL translation program in translating an XBRL instance document into a document in which the financial information embedded in the XBRL instance document is likely to be more readily appreciated by individuals unfamiliar with the XML/XBRL programming language syntax present in the instance document.

With reference to FIGS. 6-8, an XBRL instance document translation application that is resident on or in a computer readable medium and operates to translates the data that is contained within an XBRL instance document into a viewable format that is more readily understood by many individuals is described. With reference to FIG. 6, the XBRL instant document translation is executed by a processor within a computer 110. The computer 110 comprises input and output peripherals that allow a user to interact with the application. Preferably, the output peripheral on which the viewable format is displayed is a monitor and the input peripherals are a keyboard and a mouse. Other input and output peripherals are also feasible. Generally, the translation application operates to translate an XBRL instance document into a format that, when displayed, is more readily appreciated by users that are unfamiliar with XML/XBRL programming language and do not have the time or inclination to become familiar with the XML/XBRL programming language. In this regard, the translation application is capable of translating an XBRL instance document into any number of formats, including Microsoft Excel and Word formats.

With reference to FIG. 7, an embodiment of the translation application 112 is comprised of isolated or dedicated computer storage 114 that retains data that is or may be useful from one session to another of the application. The translation application 112 is further comprised of a taxonomy manager 116 that reads or obtains the taxonomy or taxonomies associated with a particular XBRL instance document that is to be translated and a an instance document manager 118 that reads/parses the relevant XBRL instance document that the user wants to have translated. The taxonomy manager 116 utilizes an XBRL parser 120 to load the present taxonomy content for each taxonomy used to build the relevant instance document. After the relevant taxonomy or taxonomies have been loaded and the relevant instance document read, an export manager uses the relevant taxonomy or taxonomies and the instance document to generate an export document that is in Excel, Word, HTML, or some other format that is readily comprehensible to most all individuals regardless of their familiarity with the XML/XBRL programming languages.

FIG. 8 illustrates an example of the operation of the translation application 112. An instance document 130 and all taxonomies relevant to the instance document are applied to the translation application 112. An XBRL instance document is comprised of attributes associated with numeric and non-numeric business report data. These attributes allow an instance document to differentiate between reporting concepts such as "shares" and "dollars" and "earnings per share." These attributes lead to presentation of the information as shown in the instance document 130. In response to the application of an instance document and related taxonomy or taxonomies, the translation application produces a intermediate document 132 that is formatted based on the metadata within the XBRL instance document. However, the translation application is also able to produce a document that is easier for most individuals to read and/or comprehend. Specifically, by comparing the calendar information associated with these attributes, the translation application is able to combine or group attributes that allow the instance document data to be displayed in a report-like format, an example of which shown in document 134. Document 134 has a format more like the original report from which the XBRL data was created.

The embodiments of the invention described herein are intended to describe the best mode known of practicing the invention and to enable others skilled in the art to utilize the invention.

What is claimed is:

1. A computer program that is resident on a computer readable medium and facilitates association of a business taxonomy attribute with business data in a computer document comprising:
    a utility configured to manage communications with a business document production application, generate a business document that contains business data and display a business document that contains business data on a computer display device;
    an extensible Business Reporting Language (XBRL) taxonomy attribute linker configured to provide a user of the computer program with an ability to associate an XBRL attribute of a business taxonomy with a business document to produce a marked up business document;
    a validation manager for validating a marked up business document to produce a validated, marked up business document;
    an export manager for processing a validated, marked up business document to produce an XBRL instance document;
    wherein, said XBRL taxonomy attribute linker, validation manager, and export manager are each operable by the user of the computer program during a common program session.

2. A computer program, as claimed in claim 1, wherein:
    said XBRL taxonomy attribute linker further providing the user with an ability to identify a location within a business document with respect to which a taxonomy attribute is to be associated, select an attribute of a business taxonomy to be associated with a location within a business document, and associate a selected attribute of a business taxonomy with an identified location within a business document.

3. A computer program, as claimed in claim 1, wherein:
    said validation manager configured to identify an error in which an insufficient number of XBRL attributes are associated with a location in a business document and notify the user of the error.

4. A computer program, as claimed in claim 1, wherein:
    said validation manager configured to identify an error in which an XBRL attribute has been associated with a location that should not be associated with the location and notifying the user of the error.

5. A computer program, as claimed in claim 1, wherein:
    said validation manager configured to compare a numeric value that is located within a business document and with which an attribute has been associated with an expected numeric value and generate an indication for the user if a numeric value does not agree with an expected numeric value.

6. A computer program, as claimed in claim 1, further comprising:
    an extension taxonomy manager that provides the user with an ability to define a new attribute that is not currently associated with a business taxonomy accessible to the program.

7. A computer program, as claimed in claim 1, further comprising:
    a form manager configured to generate a form from a business document in which an attribute has been associated with a location in a document that does not contain data.

8. A computer program, as claimed in claim 7, wherein:
    said form manager is further configured to generate a web-form suitable for posting on a web-page such that an entity can access the web-page and add data to a location in the web-page with which an attribute has been previously associated.

9. A computer program, as claimed in claim 7, wherein:
    said form manager is configured to generate a template file suitable for transmission to a computer associated with an entity and that allows the entity to add data to a location in the template file with which an attribute has been previously associated.

10. A computer program, as claimed in claim 1, wherein:
    said XBRL taxonomy attribute linker providing an ability for the user to define an attribute to include two or more attributes of a taxonomy.

11. A method of creating an extensible Business Reporting Language (XBRL) instance document, the method comprising:
    concurrently (i) displaying by a business document production application at least a portion of a business document containing business data to be tagged, and (ii) displaying by a tagging application manager integrated with the business document production application at least a portion of an XBRL taxonomy;
    responsive to one or more user input events corresponding to a selection of an XBRL attribute displayed within the portion of the XBRL taxonomy and corresponding to a request to map the selected XBRL attribute to a selected cell or range of business data displayed within the portion of the business document,
    creating XBRL markup information by forming an association between the selected XBRL attribute and the selected cell or range of business data, and
    signifying the cell or range of business data has XBRL markup data by providing a visual indication associated with the cell or range of business data; and
    generating an XBRL instance document based on the XBRL markup information and the business data.

12. The method of claim 11, wherein the business document production application comprises a spreadsheet application.

13. The method of claim 12, wherein the spreadsheet application comprises Microsoft® Excel.

14. The method of claim 11, wherein the business document production application comprises a word processing application.

15. The method of claim 14, wherein the word processing application comprises Microsoft® Word.

16. The method of claim 11, wherein the one or more user input events represent a drag and drop in which the selected XBRL attribute is dragged and dropped onto the selected cell or range of business data.

17. The method of claim 11, wherein the visual indication comprises highlighting the cell or range of business data with a color.

18. A method of creating an extensible Business Reporting Language (XBRL) form, the method comprising:

displaying by a business document production application at least a portion of a business document containing business data to be tagged;

displaying by a tagging application manager integrated with the business document production application at least a portion of an XBRL taxonomy;

responsive to one or more user input events corresponding to a selection of an XBRL attribute displayed within the portion of the XBRL taxonomy and corresponding to a request to map the selected XBRL attribute to a selected cell or range of business data displayed within the portion of the business document, creating XBRL markup information by forming an association between the selected XBRL attribute and the selected cell or range of business data; and generating an XBRL form based on the XBRL markup information.

19. The method of claim 18, wherein the XBRL form comprises an application template form from which an XBRL instance document may be created by populating marked up locations of the application template form with appropriate business data.

20. The method of claim 18, wherein the XBRL form comprises a web-based form from which XBRL instance document may be created by entering appropriate business data into marked up locations of the web-based form.

* * * * *